US011211954B2

(12) United States Patent
Pawliuk et al.

(10) Patent No.: US 11,211,954 B2
(45) Date of Patent: Dec. 28, 2021

(54) SUPPORTING MULTIPLE FREQUENCY BANDS

(71) Applicant: BlackBerry Limited, Waterloo (CA)

(72) Inventors: Peter Cornelius Pawliuk, Waterloo (CA); Nan Sen Lin, Richmond Hill (CA)

(73) Assignee: BlackBerry Limited, Waterloo (CA)

(*) Notice: Subject to any disclaimer, the term of this patent is extended or adjusted under 35 U.S.C. 154(b) by 300 days.

(21) Appl. No.: 14/643,736

(22) Filed: Mar. 10, 2015

(65) Prior Publication Data

US 2016/0269052 A1    Sep. 15, 2016

(51) Int. Cl.
| H04B 1/00 | (2006.01) |
| H04B 1/10 | (2006.01) |
| H04B 1/16 | (2006.01) |
| H04L 5/16 | (2006.01) |

(52) U.S. Cl.
CPC ............. *H04B 1/0035* (2013.01); *H04B 1/10* (2013.01); *H04B 1/16* (2013.01); *H04L 5/16* (2013.01)

(58) Field of Classification Search
CPC .......... H04B 1/0035; H04B 1/10; H04B 1/16; H04L 5/16
See application file for complete search history.

(56) References Cited

U.S. PATENT DOCUMENTS

| 3,793,486 | A | * | 2/1974 | Koziol | H04L 27/10 |
| | | | | | 375/222 |
| 6,023,611 | A | * | 2/2000 | Bolin | H03F 3/1935 |
| | | | | | 330/149 |
| 6,097,580 | A | * | 8/2000 | Zaretsky | H02H 3/33 |
| | | | | | 361/42 |
| 9,184,960 | B1 | * | 11/2015 | Harel | H04L 25/03006 |
| 2008/0026709 | A1 | * | 1/2008 | Liu | H04B 1/0067 |
| | | | | | 455/121 |
| 2008/0139149 | A1 | * | 6/2008 | Mu | H03D 7/1441 |
| | | | | | 455/200.1 |

(Continued)

FOREIGN PATENT DOCUMENTS

JP    WO2015080243 A1 * 11/2014 ............... H04B 1/40

OTHER PUBLICATIONS

ETSI TS 136 101 v 12.5.0 (2014) LTE; Evolved Universal Terrestrial Radio Access (E-UTRA); User Equipment (UE) radio transmission and reception (3GPP TS 36.101 version 12.5.0 Release 12); (Year: 2014).*

(Continued)

*Primary Examiner* — Jeffrey M Rutkowski
*Assistant Examiner* — Ning Li
(74) *Attorney, Agent, or Firm* — Fish & Richardson P.C.

(57) ABSTRACT

A channel sharing method includes receiving a signal in a frequency band. The frequencies in the signal above a cutoff frequency are filtered to generate a filtered signal. The cutoff frequency is determined based on a frequency region that includes a plurality of frequency bands. The filtered signal is amplified using a mixer-tuned low noise amplifier (LNA). The mixer-tuned LNA includes a passive switching mixer and an LNA. The passive switching mixer presents a tunable impedance to the LNA. The LNA provides a voltage gain to the passive switching mixer. The voltage gain being proportional to the tunable impedance.

14 Claims, 7 Drawing Sheets

(56) References Cited

U.S. PATENT DOCUMENTS

| | | | | |
|---|---|---|---|---|
| 2010/0317308 A1* | 12/2010 | Mirzaei | ............... | H04B 1/30 455/230 |
| 2012/0007605 A1* | 1/2012 | Benedikt | ............ | G01R 27/32 324/612 |
| 2013/0016633 A1* | 1/2013 | Lum | ............... | H04B 1/0057 370/277 |
| 2013/0053103 A1* | 2/2013 | Kim | .................... | H04L 5/003 455/561 |
| 2014/0376428 A1* | 12/2014 | Verma | ............. | H04L 5/0023 370/297 |
| 2015/0280774 A1* | 10/2015 | Uejima | ............. | H04B 1/44 455/78 |
| 2015/0311874 A1* | 10/2015 | Samelis | ............. | H04B 1/44 455/95 |
| 2016/0099733 A1* | 4/2016 | Weissman | ............ | H03F 3/24 455/114.2 |
| 2016/0198339 A1* | 7/2016 | Siomina | ........... | H04W 76/14 455/41.2 |
| 2016/0294435 A1* | 10/2016 | Laurila | ............ | H04B 1/0475 |
| 2016/0344100 A1* | 11/2016 | Onaka | ............... | H04B 1/525 |
| 2017/0170792 A1* | 6/2017 | Samelis | ............... | H04B 1/44 |

OTHER PUBLICATIONS

Extended European Search Report issued in European Application No. 16159322.3 dated Jul. 28, 2016.
Borremans et al. "A 40 nm CMOS 0.4-6 GHz Receiver Resilient to Out-of-Band Blockers"; IEEE Journal of Solid State Circuits, vol. 46, No. 7, Jul. 2011.
European Communication pursuant to Article 94(3) EPC in European Application No. 16159322.3 dated Feb. 6, 2018, 4 pages.
European Communication Pursuant to Article 94(3) EPC in European Application No. 16159322.3 dated Jan. 17, 2019, 4 pages.

\* cited by examiner

SUPPORTING MULTIPLE FREQUENCY BANDS

TECHNICAL FIELD

This disclosure relates to data transmission in communication systems and, more specifically, to supporting multiple frequency bands in a wireless communication operation.

BACKGROUND

In a wireless communication system, the communication signals are transmitted and received in a frequency band. In some cases, the range of frequency bands may be defined in a specification of the wireless communication system. For example, the frequency bands for the Long Term Evolution (LTE) system are defined in the Third Generation Partnership Project (3GPP) LTE radio frequency specifications. The systems of different operators may use different frequency bands to provide wireless communication services. In addition, the same operator may use different frequency bands in different regions to provide wireless communication services. Therefore, a user equipment (UE) may support multiple frequency bands in order to receive services in different regions and from different operators.

In some cases, a wireless communication service can be provided in a half duplex operation. In a half duplex operation, an uplink (UL) transmission and a downlink (DL) transmission may not occur at the same time. For example, the UE may receive signals in the DL at a subframe, and transmit signals in the UL at another subframe. Examples of half duplex operations include Time Division Duplex (TDD) operation and half duplex Frequency Division Duplex (FDD) operation. In a TDD operation, both the UL and DL signals are transmitted using the same frequency. In a half duplex FDD mode, the UL and DL signals are transmitted using different frequencies in the same frequency band, but not at the same time. The half duplex operation may reduce the implementation complexity of a UE, because the transmitted signal from the UE does not need to be isolated from the receiver of the UE. Therefore, UE that supports half duplex operation are suitable for low cost applications, e.g., machine-type communications (MTC).

DESCRIPTION OF DRAWINGS

Like reference numbers and designations in the various drawings indicate like elements.

DETAILED DESCRIPTION

The present disclosure is directed to supporting multiple frequency bands in a wireless communication operation. A user equipment (UE) that supports multiple frequency bands may include transceiver modules that can transmit and receive signals in each frequency band. In some cases, the UE may include multiple transceiver modules. Each transceiver module is configured to transmit and receive signals in one frequency band. Each transceiver module may include a band-specific filter that is configured to filter frequencies outside of the frequency band. The band-specific filter may remove out-of-band blockers and spectral emissions. In some implementations, the band-specific filter is communicably coupled with a transmitter and a receiver chain in the transceiver module to transmit and receive signals in the frequency band. In some cases, a UE may support a large number of frequency bands and, therefore, may include a large number of transceiver modules, and their associated band-specific filters and transmitter and receiver chains. This approach increases the complexity and costs of the UE. In addition, in some cases, an operator may provide services in a new frequency band. A UE that does not have the band-specific filter for the new frequency band may not be able to receive services in the new frequency band.

In some cases, software defined radio may be implemented to tune a circuit to remove out-of-band blocks. However, in a software defined radio, one wideband module is configured to support all potentially available frequency bands. Therefore, it is difficult to optimize impedance matching and noise performance of the wideband module for each frequency band. In addition, it is difficult to prevent interference at harmonic frequencies.

Figure 1:
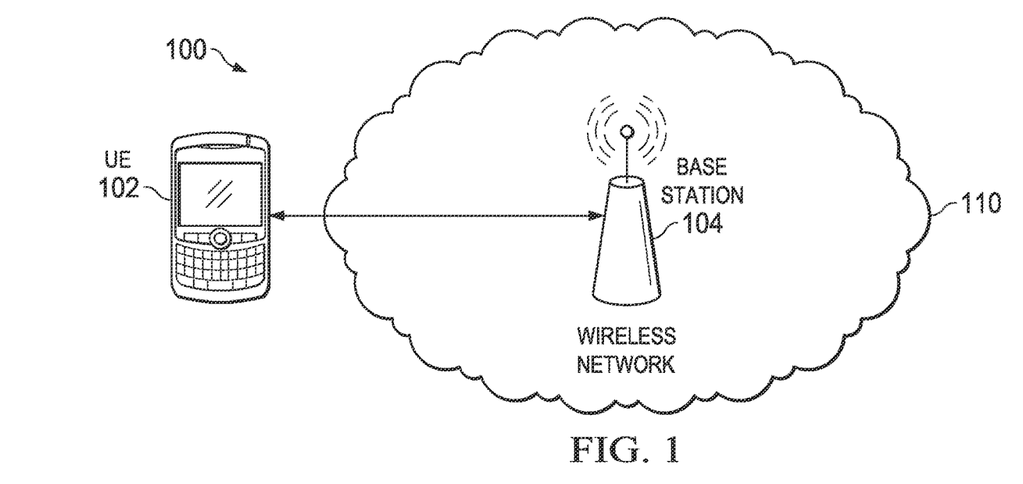
FIG. 1 is an example wireless communication system that supports multiple frequency bands in a wireless communication operation.

FIG. 1 is an example wireless communication system 100 that supports multiple frequency bands in a wireless communication operation. For example, a UE may receive a signal in a frequency band. In some cases, the signal is formatted for a half-duplex operation. The UE may filter frequencies in the signal above a cutoff frequency to generate a filtered signal. The cutoff frequency is determined based on a frequency region that includes a plurality of frequency bands. In some cases, the cutoff frequency is determined based on a harmonic frequency of a lowest frequency band in the frequency region. The UE may amplify the filtered signal using a mixer-tuned low noise amplifier (LNA). The mixer-tuned LNA includes a passive switching mixer and an LNA. The passive switching mixer presents a tunable impedance to the LNA. The LNA provides a voltage gain to the passive switching mixer. The voltage gain is proportional to the tunable impedance. In some cases, the tunable impedance includes an in-band impendence for frequencies within the frequency band, and an out-of-band impedance for frequencies outside of the frequency band, wherein the in-band impedance is greater than the out-of-band impedance. In some cases, the passive switching mixer's impedance is tuned for different frequency bands by the quadrature gate-drive signal. In some cases, the LNA includes at least one of a cascode LNA or common base low noise amplifier. In some cases, the passive switching mixer includes a plurality of complementary metal oxide semiconductor (CMOS) field effect transistors (FETs). Each CMOS FET is loaded with a capacitor. In some cases, the passive switching mixer is driven by a quadrature signal generator that is configured to operate at a reduced duty cycle Supporting multiple frequency bands according to methods and systems described herein may provide one or more advantages. For example, the UE can use a mixer-tuned LNA to provide different amplification gains for out-of-band and in-band frequencies of the signal and, therefore, increases the blocker rejection ratio. This approach can enable the UE to remove the band-specific filter and support multiple frequency bands with one transceiver module. Therefore, the complexity of the UE may be reduced. The reduced complexity may make it easier to implement the transceiver module for multiple frequency bands on the same chip and, therefore, reduces the footprint and cost of the UE. Using a mixer-tuned LNA may also enable the UE to support new frequency bands without hardware change. In addition, by grouping multiple frequency bands in different frequency regions and filtering the signal based on a harmonic frequency of the frequency band in each region, the impedance matching, noise performance, and harmonic signal rejection can be optimized for different regions. Furthermore, using a cutoff frequency that is further away from the frequency band, the through loss of the signal may be reduced. The reduction of through loss may improve the receiver sensitivity and the transmitter efficiency of the UE. Therefore, the power consumption of the UE may be reduced.

At a high level, the example wireless communication system 100 includes a UE 102 and a wireless communication network 110, which includes a base station 104 that is configured to communicate with the UE 102. In the illustrated example, the UE 102 and the base station 104 may operate in a half-duplex operation. For example, the UE 102 may receive a signal from the base station 104 in a frequency band at one subframe. The UE 102 may filter frequencies in the signal above a cutoff frequency to generate a filtered signal. The cutoff frequency may be determined based on a frequency region that includes the frequency band. For example, the cutoff frequency may be determined by the second harmonic of the lowest frequency in the frequency band. The UE 102 may amplify the filtered signal using a mixer-tuned low noise amplifier (LNA). The mixer-tuned LNA may include a passive switching mixer and an LNA. The passive switching mixer may present a tunable impedance to the LNA. The LNA may provide a voltage gain to the passive switching mixer. The voltage gain may be proportional to the tunable impedance. FIGS. 2-9 and associated descriptions provide additional details of these implementations.

Turning to a general description of the elements, a UE may be referred to as mobile electronic device, user device, mobile station, subscriber station, portable electronic device, mobile communications device, wireless modem, or wireless terminal. Examples of a UE (e.g., the UE 102) may include a cellular phone, personal data assistant (PDA), smart phone, laptop, tablet personal computer (PC), pager, portable computer, portable gaming device, wearable electronic device, or other mobile communications device having components for communicating voice or data via a wireless communication network. The wireless communication network may include a wireless link over at least one of a licensed spectrum and an unlicensed spectrum.

Other examples of a UE include mobile and fixed electronic device. A UE may include a Mobile Equipment (ME) device and a removable memory module, such as a Universal Integrated Circuit Card (UICC) that includes a Subscriber Identity Module (SIM) application, a Universal Subscriber Identity Module (USIM) application, or a Removable User Identity Module (R-UIM) application. The term "UE" can also refer to any hardware or software component that can terminate a communication session for a user. In addition, the terms "user equipment," "UE," "user equipment device," "user agent," "UA," "user device," and "mobile device" can be used synonymously herein.

The wireless communication network 110 may include one or a plurality of radio access networks (RANs), core networks (CNs), and external networks. The RANs may comprise one or more radio access technologies. In some implementations, the radio access technologies may be Global System for Mobile communication (GSM), Interim Standard 95 (IS-95), Universal Mobile Telecommunications System (UMTS), CDMA2000 (Code Division Multiple Access), Evolved Universal Mobile Telecommunications System (UMTS), Long Term Evaluation (LTE), or LTE-Advanced. In some instances, the core networks may be evolved packet cores (EPCs).

A RAN is part of a wireless telecommunication system which implements a radio access technology, such as UMTS, CDMA2000, 3GPP LTE, and 3GPP LTE-A. In many applications, a RAN includes at least one base station 104. A base station 104 may be a radio base station that may control all or at least some radio-related functions in a fixed part of the system. The base station 104 may provide radio interface within their coverage area or a cell for the UE 102 to communicate. The base station 104 may be distributed throughout the cellular network to provide a wide area of coverage. The base station 104 directly communicates to one or a plurality of UEs, other base stations, and one or more core network nodes.

While described in terms of FIG. 1, the present disclosure is not limited to such an environment. The base station 104 may operate on any of the different wireless communication technologies. Example wireless technologies include Global System for Mobile Communication (GSM), Universal Mobile Telecommunications System (UMTS), 3GPP Long Term Evolution (LTE), LTE-Advanced (LTE-A), wireless broadband communication technologies, and others. Example wireless broadband communication systems include IEEE 802.11 wireless local area network, IEEE 802.16 WiMAX network, and others.

While elements of FIG. 1-9 are shown as including various component parts, portions, or modules that implement the various features and functionality, nevertheless these elements may instead include a number of sub-modules, third-party services, components, libraries, and such, as appropriate. Furthermore, the features and functionality of various components can be combined into fewer components as appropriate.

Figure 2:
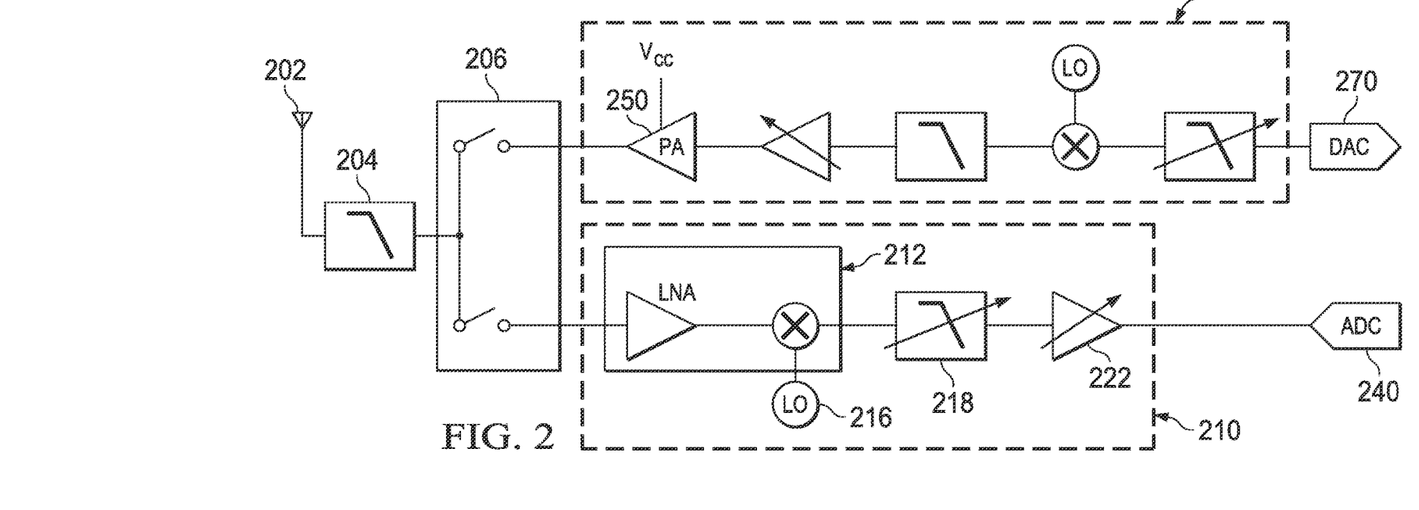
FIG. 2 is a schematic diagram illustrating an example transceiver module for one frequency region.

FIG. 2 is a schematic diagram illustrating an example transceiver module 200 for one frequency region. The example transceiver module 200 includes an antenna 202, a harmonic filter 204, a duplex switch 206, a receiver 210, a transmitter 260, an Analog to Digital Convertor (ADC) 240, and a Digital to Analog Convertor (DAC) 270. The described illustration is only one possible implementation of the described subject matter and is not intended to limit the disclosure to the single described implementation. The described components can be connected, combined, or used in alternative ways consistent with this disclosure.

As illustrated, the example transceiver module 200 includes the antenna 202 that is configured to receive and transmit a signal. For example, in a DL subframe, the antenna 202 may receive a signal from the base station and pass the signal to the harmonic filter 204. In a UL subframe, the antenna 202 may receive a signal from the harmonic filter 204 and transmit the received signal to the base station.

The example transceiver module 200 includes the harmonic filter 204. The harmonic filter 204 represents a filter that is configured to generate a filtered signal for a frequency region. A frequency region can include a plurality of frequency bands. For example, most of the frequency bands defined by 3GPP LTE specifications reside from 699 MHz to 2600 MHz. In some cases, three frequency regions may be defined as follows:

Low Band (LB)~699 MHz to 960 MHz
Mid Band (MB)~1710 MHz to 2200 MHz
High Band (HB)~2200 MHz to 2690 MHz The harmonic filter 204 may be configured to generate a filtered signal for the LB, MB, or HB region. For example, the harmonic filter 204 can be configured for the LB region. The LB region may include 3GPP band 5, which has DL frequencies ranging from 869 MHz to 894 MHz and UL frequencies ranging from 824 MHz to 849 MHz; 3GPP band 13, which has DL frequencies ranging from 746 MHz to 756 MHz and UL frequencies ranging from 777 MHz to 787 MHz; 3GPP band 44, which is a TDD band that has frequencies ranging from 703 MHz to 803 MHz; and other 3GPP bands in the region.

In some cases, the harmonic filter 204 may be configured to filter frequencies above a cutoff frequency in a signal to generate the filtered signal. In some cases, the cutoff frequency may be set so that the harmonic frequencies of the signal within the frequency region are filtered. Therefore, the cutoff frequency may be determined based on the lowest frequency band in the frequency region of the harmonic filter 204. In some cases, the cutoff frequency may be determined based on the second harmonic of the lowest frequency in the desired frequency region. For example, in the LB region, the lowest frequency band is the 3GPP band 12, which has frequencies starting from 699 MHz. The second harmonic frequency of the lowest frequency is 1398 MHz. In some cases, the cutoff frequency may be set at 1200 MHz. In these or other cases, the harmonic filter 204 may be configured to filter out the frequencies above 1200 MHz and, therefore, rejects the harmonic frequencies of the signal for any frequency band within the LB region. Because the harmonic filter 204 operates in a much wider region than the band-specific filter, the through loss of the signal may be reduced. The reduction in through loss may improve both the receiver sensitivity and the transmitter efficiency and, therefore, may save battery consumption of the UE.

Figure 8:
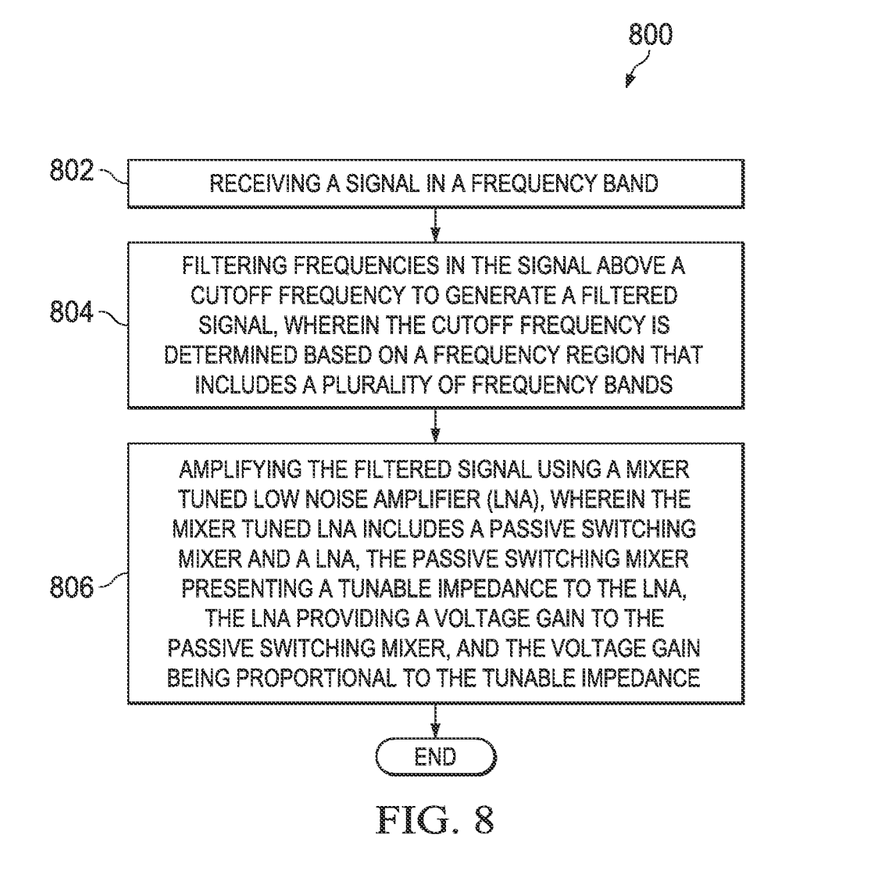
FIG. 8 is a flow chart illustrating an example method for supporting multiple frequency bands.

In some cases, two frequency regions may be defined. For example, the MB and the HB regions described above may be combined into one region. FIG. 8 and associated descriptions will provide additional details of these implementations.

The example transceiver module 200 also includes a duplex switch 206 that is configured to switch between a receiving and transmitting in different subframes of a half-duplex operation. For example, in a DL subframe, the duplex switch 206 may connect the harmonic filter 204 with the receiver 210 to process the received DL signal. In a UL subframe, the duplex switch 206 may connect the harmonic filter 204 with the transmitter 260 to transmit the UL signal.

The example transceiver module 200 also includes the transmitter 260 that is configured to receive an analog signal from the DAC 270 and generate a transmission signal. In some cases, the transmitter 260 may be configured to modulate the analog signal at a transmit frequency. The transmit frequency may be the UL frequency of the frequency band that the UE operates in. As illustrated, the transmitter 260 includes a power amplifier 250. The power amplifier 250 is configured to amplify transmission signal for the frequency region. In some cases, the transmission signal generated by the transmitter 260 may include harmonic frequencies. In these or other cases, these harmonic frequencies may be filtered by the harmonic filter 204.

The example transceiver module 200 also includes the DAC 270 that is configured to convert a baseband transmission signal to the analog signal. In some cases, the DAC 270 may receive the baseband transmission signal from a baseband processor of the UE, convert the baseband transmission signal into the analog signal, and pass the analog signal to the transmitter 260.

The example transceiver module 200 also includes the receiver 210. The receiver 210 represents a circuit that is configured to receive a filtered signal in a frequency region and generate an amplified signal. Because the harmonic filter 204 filters the signal at the cutoff frequency for a wide frequency region instead of a narrow frequency band, the filtered signal includes both in-band and out-band signals. Therefore, to reduce the non-linear distortion introduced by the out-of-band signal, the receiver 210 is configured to amplify the in-band portion of the signal with a larger gain than the out-of-band portion of the signal by using a mixer-tuned LNA.

Figure 3:
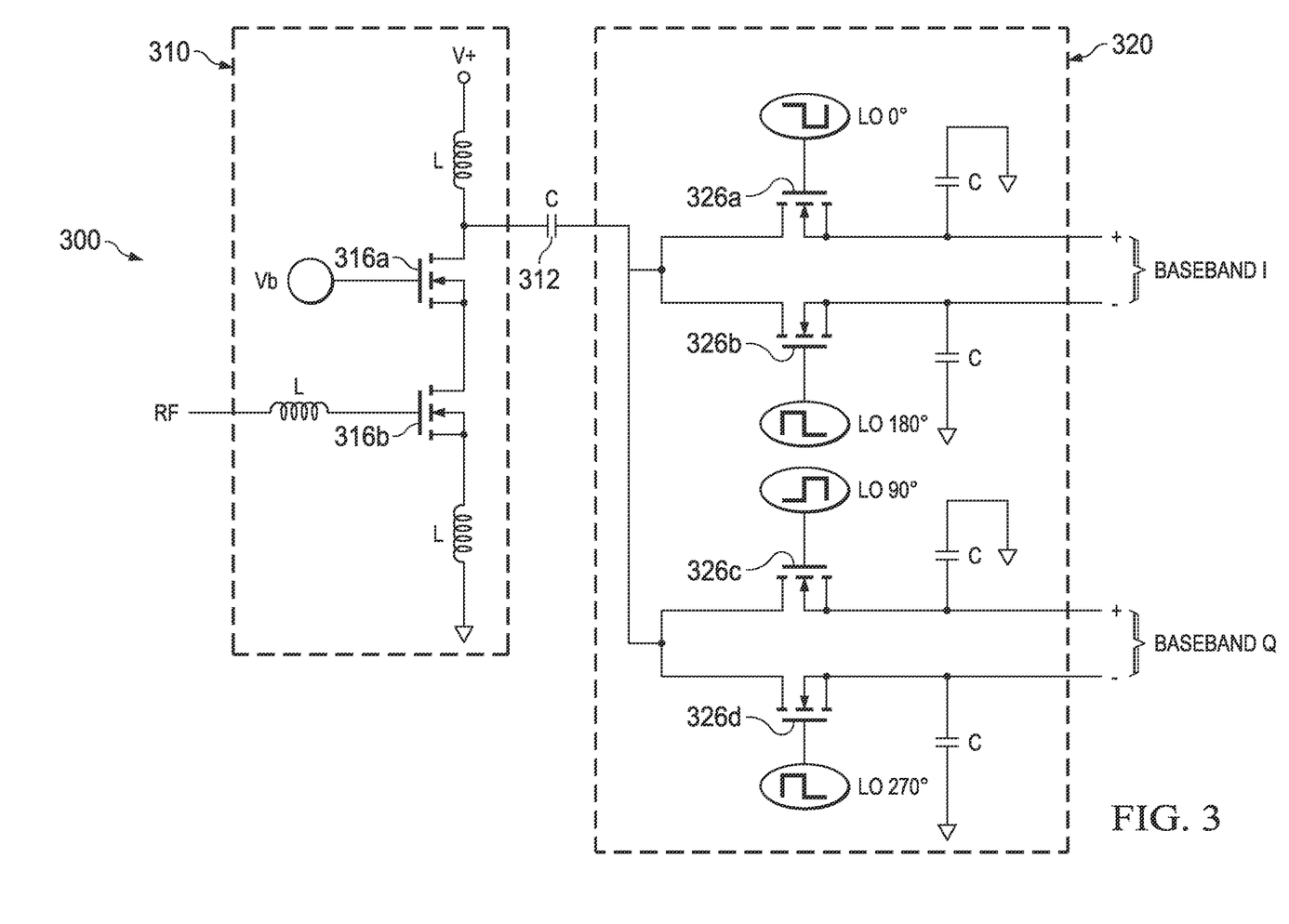
FIG. 3 is a schematic diagram illustrating an example mixer-tuned low noise amplifier (LNA).
Figure 4:
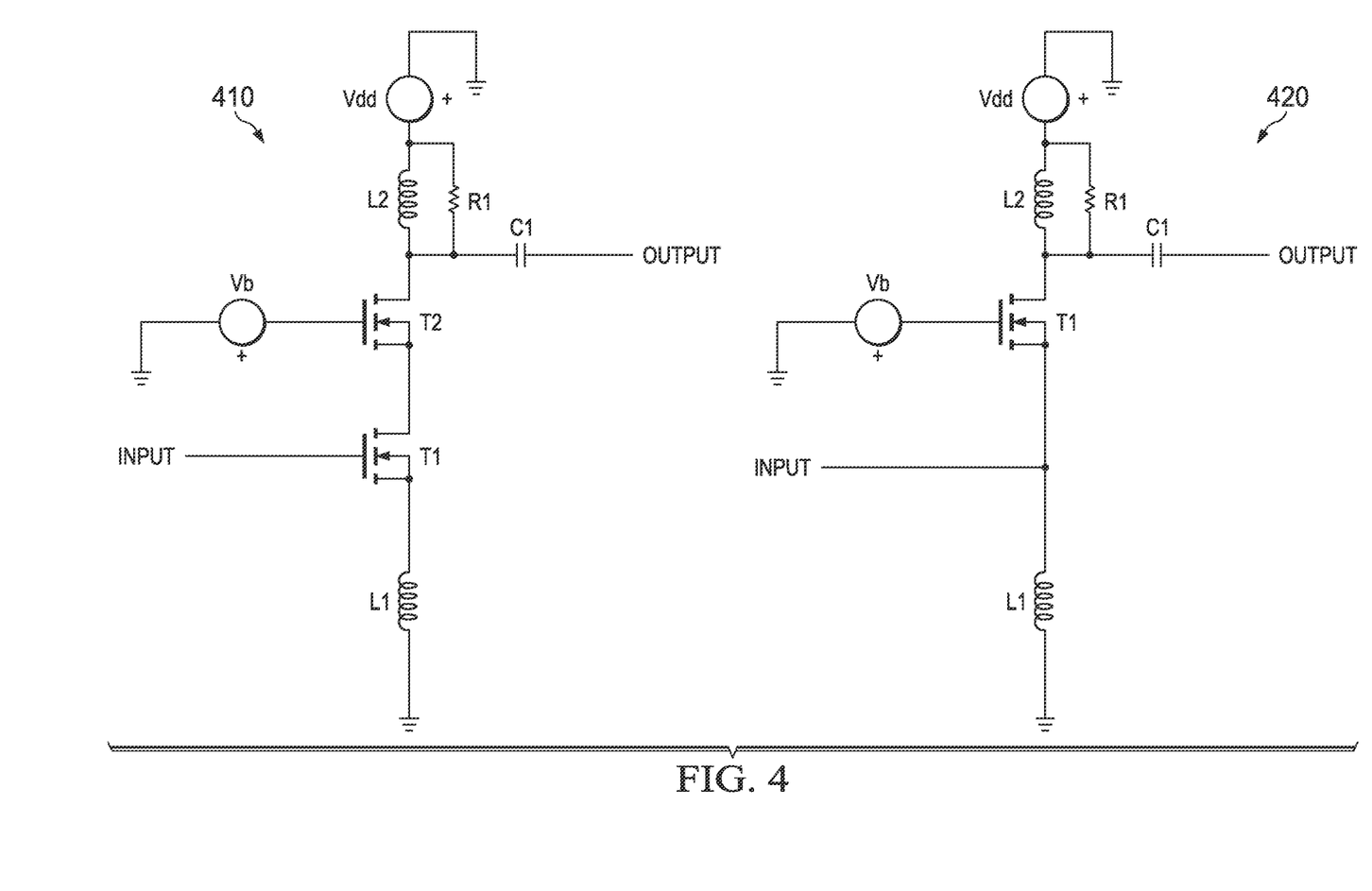
FIG. 4 is a schematic diagram illustrating a cascode LNA and an example common base LNA.
Figure 5:
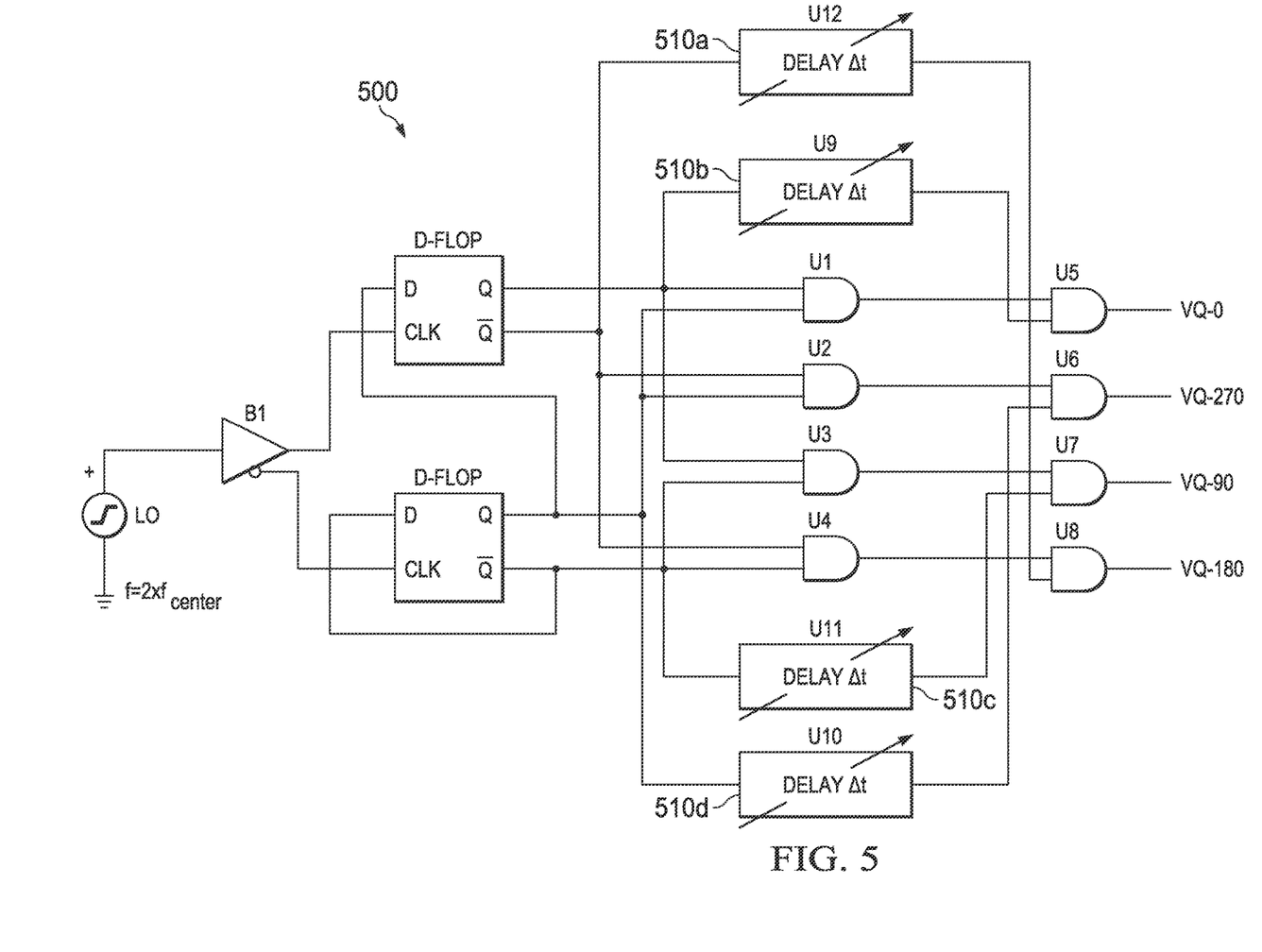
FIG. 5 is a schematic diagram illustrating a gate drive architecture of an example quadrature signal generator with variable duty cycle.

As illustrated, the receiver 210 includes a mixer-tuned LNA 212, a local oscillator 216, a low pass filter 218, and a gain selector 222. The mixer-tuned LNA 212 includes an LNA and a passive switching mixer. The passive switching mixer may present a tunable impedance to the LNA. The tunable impedance may be tuned to provide a larger in-band impedance than the out-band impedance. The LNA may provide a voltage gain that is proportional to the tunable impedance. Therefore, when the signal passes the mixer-tuned LNA 212, the in-band portion of the signal is amplified with a larger gain than the out-of-band portion. FIGS. 3-5 and associated descriptions provide additional details of these implementations.

The receiver 210 also includes the local oscillator 216 that drives the mixer-tuned LNA 212. In some cases, the local oscillator 216 may be a quadrature signal generator that generates four phases of the driving frequency. The driving frequency may be set to the frequency in the frequency band that the UE operates. In some cases, the quadrature signal generator may be configured to operate at a reduced duty cycle and, therefore, increases the gain differential between the in-band portion and the out-of-band portion of the amplified signal. FIGS. 3-5 and associated descriptions provide additional details of these implementations.

Figure 6:
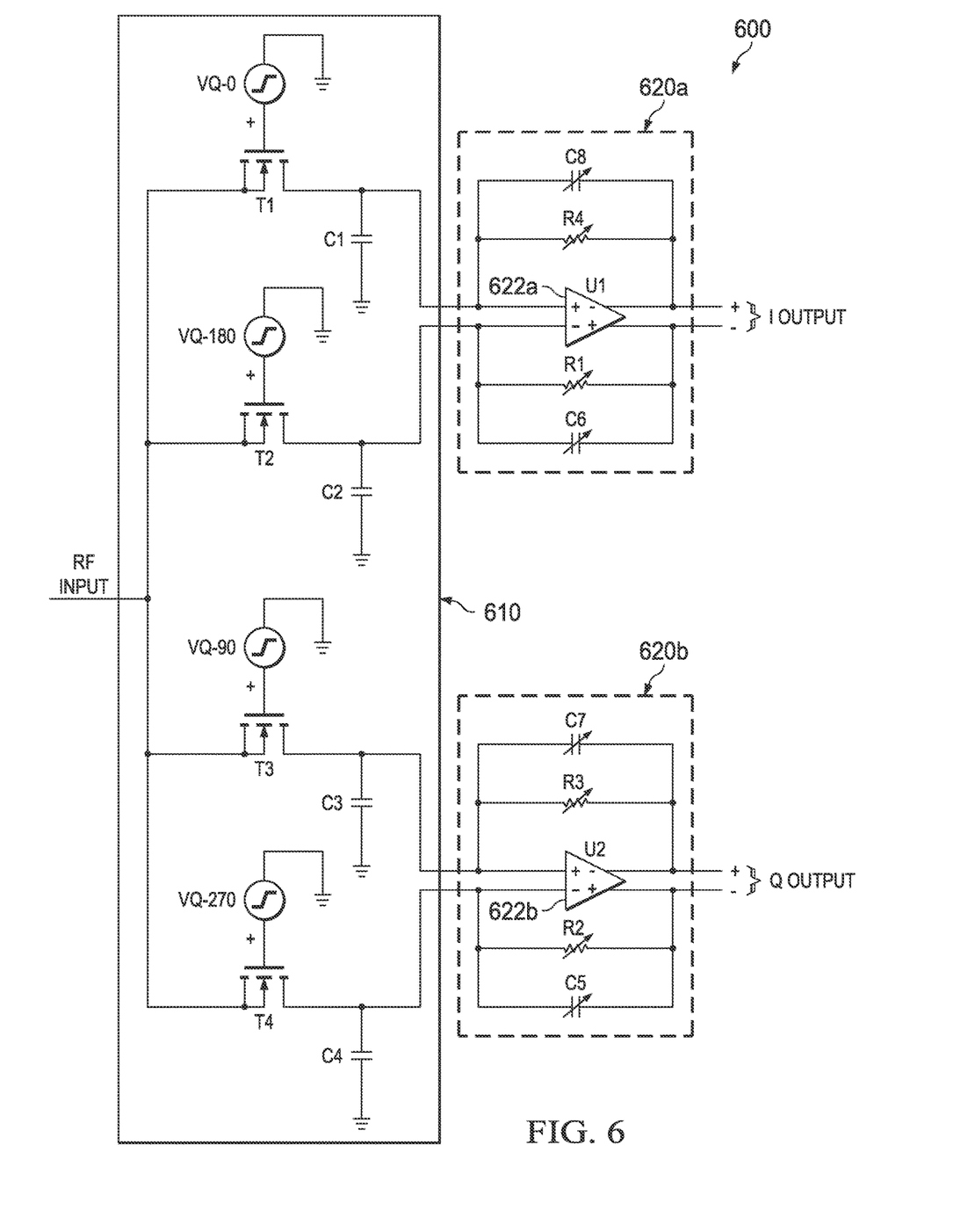
FIG. 6 is a schematic diagram illustrating an example active low pass filter following a mixer

As illustrated, the receiver 210 includes a low pass filter 218 that is configured to filter the amplified signal at the frequency band. The receiver 210 also includes a gain selector 222 that is configured to set a gain for the filtered amplified signal and generate an analog received signal. In some cases, the low pass filter 218 and the gain selector 222 may be implemented using an active filter. FIG. 6 and associated descriptions provide additional details of these implementations.

The example transceiver module 200 also includes the ADC 240 that is configured to convert the analog received signal into the baseband received signal. In some cases, the baseband received signal may be passed to a baseband processor for baseband demodulation, decoding, de-interleaving, or any other baseband processing.

FIG. 3 is a schematic diagram illustrating an example mixer-tuned LNA 300. As illustrated, an input signal in the radio frequency (RF) region passes through an LNA 310, a capacitor 312, and a passive switching mixer 320, and generates both I and Q output signals in the baseband. The LNA 310 and the passive switching mixer 320 are configured to reduce the saturation and non-linear effects from the out-of-band portion of the RF signal.

The LNA 310 may be implemented using a cascode LNA, a common base LNA, or other LNA that can be configured to a voltage gain that is proportional to the output impedance presented by the passive switching mixer 320. In the illustrated example, the LNA 310 is implemented using a cascode LNA. The LNA 310 includes complementary metal oxide semiconductor (CMOS) field effect transistors (FETs) 316*a-b*. The LNA 310 also includes two Voltage sources. One of the Voltage source has a fixed bias against the other Voltage source. A cascode LNA may include one or more resistors (R), conductors (L), capacitors (C), or a combination thereof. In some cases, the cascode LNA may be implemented with different arrangements of R, L, C components as illustrated in FIG. 3. For example, FIG. 4 illustrates an alternative cascode LNA 410 that can be used in the mixer-tuned LNA 300. In some cases, a common base LNA may be used as the LNA 310. FIG. 4 illustrates a gate drive architecture of an example common base LNA 420 that can be used in the mixer-tuned LNA 300.

Referring to FIG. 3, the passive switching mixer 320 includes 4 MOSFETs 326*a-d*. Each of the MOSFET 326*a-d* is loaded with a respective capacitor. The passive switching mixer 320 is driven by the signal of a local oscillator. The driving signal is set at the frequency band that the UE operates. In some cases, the local oscillator is implemented using a quadrature signal generator, and the driving signal is provided in four phases. Each phase of the driving signal drives one MOSFET to generate a high impedance for frequencies with the frequency band and a low impedance for frequencies outside of the frequency band. In some cases, there may be a narrow transition region at the edge of the frequency band, where the impedance drops from the high in-band level to the low out-of-band level. Therefore, when the signal passes through the LNA 310 and the passive switching mixer 320, the in-band signal is amplified by the high voltage gain provided by the LNA 310 in accordance with the high in-band impedance presented by the passive switching mixer 320. The out-of-band signal is amplified by the low voltage gain provided by the LNA 310 in accordance with the low in-band impedance presented by the passive switching mixer 320.

In some cases, the local oscillator may be configured to provide driving signal for different frequency bands. Accordingly, the passive switching mixer 320 may be configured to present tunable impedance for different frequency bands. Therefore, the UE may support different frequency bands with one set of transceiver chain to reduce implementation complexity.

In some cases, the local oscillator may be configured to operate in a reduced duty cycle. In one example, the local oscillator is implemented using a quadrature signal generator. The quadrature signal generator generates driving signal in four phases and, therefore, may operate at a duty cycle near 25%. The quadrature signal generator may also be configured to operate at a duty cycle that is lower than 25%. This operation may cause the in-band impedance of the passive switching mixer to increase at a much higher rate than the out-of-band impedance. Therefore, the gain differential between the in-band and out-of-band gain generated by the LNA is also increased. This approach increases the blocker rejection ratio of the mixer-tuned LNA.

FIG. 5 is a schematic diagram illustrating a gate drive architecture of an example quadrature signal generator 500 that is configured to operate at a reduced duty cycle. As illustrated, a local oscillator generates a local oscillator signal at double rate of the tunable frequency. The local oscillator signal is split into a normal and an inverted signal. These signals then drive two D flip-flops that are configured to divide the frequency of the local oscillator signal by two. The outputs of the two D flip-flops are 90 degrees out of phase. By combining the regular and inverted outputs in AND gates, four quadrature gate drives can be generated. These quadrature signals are then driven to higher power and appropriate voltage levels for driving the FET gates in a passive switching mixer.

As illustrated, the example quadrature signal generator 500 includes tunable delay blocks 510*a-d*. The tunable delay blocks 510*a-d* are configured to add a small delay to the 50% duty signals. The delay signal are then combined with the 25% duty cycle quadrature signals in an AND gate and, therefore, reduces the width of each pulse produced by the example quadrature signal generator 500. As a result, the duty cycle of the example quadrature signal generator 500 is reduced. The length of the delay introduced by the tunable delay blocks may affect the amount of the reduction of the duty cycle. In some cases, increasing the delay may increase the reduction of the duty cycle. In some cases, the tunable delay blocks 510*a-d* may be configured to tune to different amount of delays.

In some cases, the reduction of the duty cycle may affect the performance of the passive switching mixer. In these or other cases, the reduction of the duty cycle may be set in a region that balances the increase of the gain differential by the LNA with the loss of the performance by the passive switching mixer. In some cases, the reduction may be configured to be between 0 to 12.5%, resulting a duty cycle between 12.5% to 25%.

In some cases, the duty cycle may be reduced using alternative methods. For example, instead of using the tunable delay blocks 510*a-d*, a fixed duty cycle signal generator may be used. The fixed duty cycle signal generator may be configured to operate at a fixed duty cycle that is below 25%.

FIG. 6 is a schematic diagram 600 illustrating an example mixer with output connected to a tunable, active, low pass filter. As discussed previously related to FIG. 2, an active filter can be implemented to provide the combined functions of a low pass filter and a gain selector. As illustrated, the schematic diagram 600 includes a passive switching mixer 610 and active filters 620*a-b*. Each of the active filters 620*a-b* includes one of low pass filters 622*a-b*, and a combination of R and C components. As discussed previously, the input signal passes through the LNA and the passive switching mixer 610 to generate an amplified signal with different gains for in-band and out-of-band frequencies. The amplified signals are split into an I and Q component. Each of the active filters 620*a-b* are configured to operate on the I and Q components, respectively. The low pass filter 622*a-b* amplifies and filters the incoming signal using negative feedback. In some cases, the bandwidth and gain of the active filters 620*a-b* can be controlled by using variable components in the R-C combination. In some cases, the impedance of the active filters 620*a-b* are set to be a high value to reduce the impact on the performance of the mixer-tuned LNA.

Figure 7:
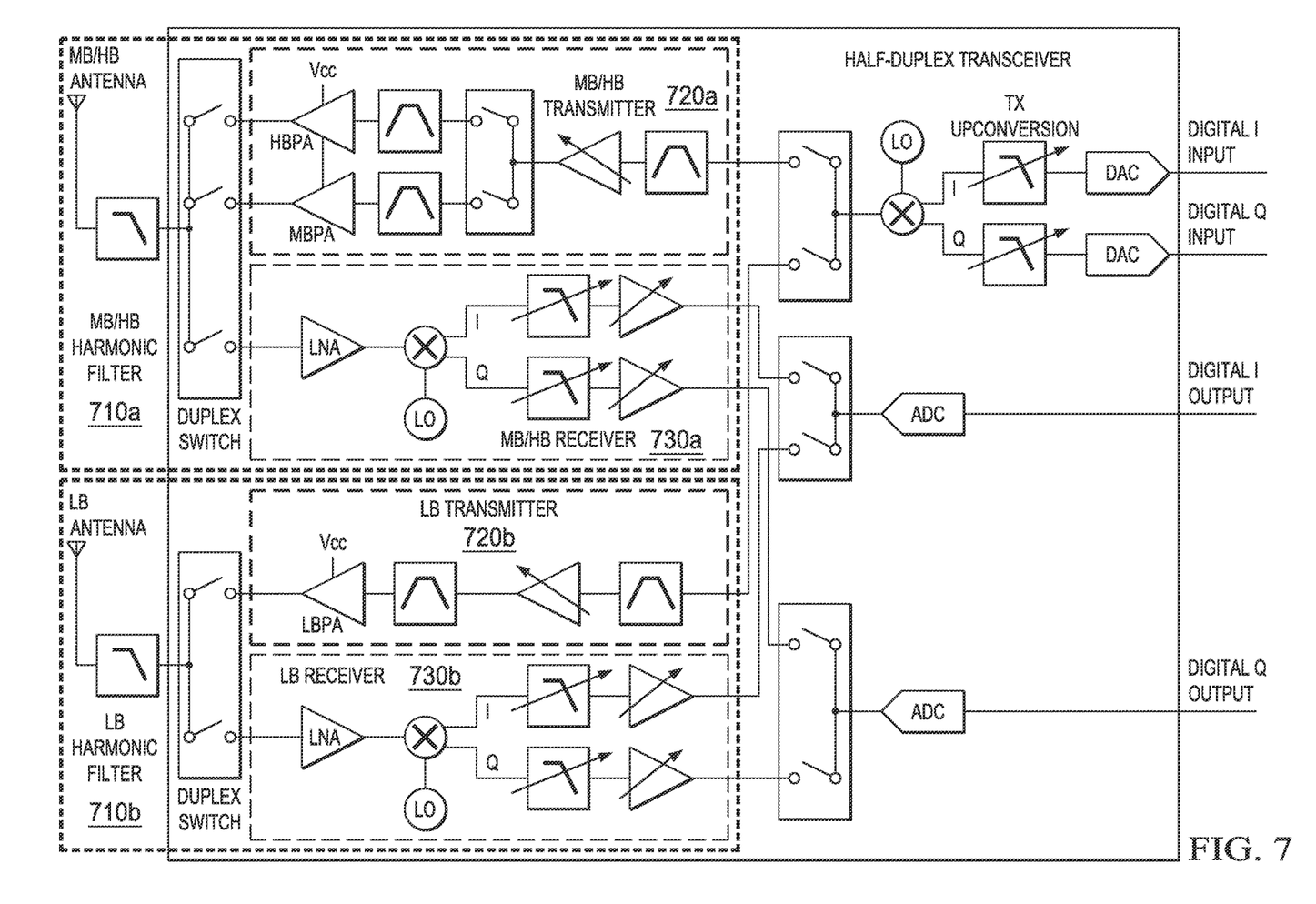
FIG. 7 is a schematic diagram of an example multi-band transceiver in a UE.

FIG. 7 is a schematic diagram of an example transceiver 700 in a UE. The example transceiver 700 includes a transceiver module 710*a* for the combined MB and HB frequency region and a transceiver module 710*b* for the LB frequency region. The transceiver module 710*a* includes an antenna, a duplex switch, and a harmonic filter that is configured based on the combined MB and HB frequency region. The transceiver module 710a also includes a transmitter 720a and a receiver 730a that are configured to transmit and receive signals in frequency bands that reside in the combined MB and HB frequency region. As illustrated, the transmitter 720a includes a HB power amplifier to amplify transmission signal for the HB region and a MB power amplifier to amplify transmission signal for the MB region. The transceiver module 710b includes an antenna, a duplex switch, and a harmonic filter that is configured based on the LB frequency region. The transceiver module 710b also includes a transmitter 720b and a receiver 730b that are configured to transmit and receive signals in frequency bands that reside in the LB frequency region. In some cases, the transceiver modules for different frequency regions may share one or more components. For example, as illustrated, the transmitters in the transceiver module 710a-b may share DACs, active mixers, and low pass filters. The receivers in the transceiver module 710a-b may share ADCs. In some cases, a UE may have three transceiver modules, each configured to operate in LB, MB, and HB frequency region, respectively.

FIG. 8 is a flow chart illustrating an example method 800 for supporting multiple frequency bands. The method 800 may begin at block 802, where a signal in a frequency band is received. In some cases, the signal is formatted for a half-duplex operation.

At block 804, frequencies in the signal above a cutoff frequency are filtered to generate a filtered signal. The cutoff frequency is determined based on a frequency region that includes a plurality of frequency bands. In some cases, the cutoff frequency is determined based on a harmonic frequency of a lowest frequency band in the frequency region. In some cases, the harmonic frequency is the second harmonic frequency.

At block 806, the filtered signal is amplified using a mixer-tuned low noise amplifier (LNA). The mixer-tuned LNA includes a passive switching mixer and an LNA. The passive switching mixer presents a tunable impedance to the LNA. The LNA provides a voltage gain to the passive switching mixer. The voltage gain is proportional to the tunable impedance. In some cases, the tunable impedance includes an in-band impendence for frequencies within the frequency band, and an out-of-band impedance for frequencies outside of the frequency band, wherein the in-band impedance is greater than the out-of-band impedance. In some cases, the passive switching mixer is configured to present tunable impedances for different frequency bands. In some cases, the LNA includes at least one of a cascode LNA or common base low noise amplifier. In some cases, the passive switching mixer includes a plurality of complementary metal oxide semiconductor (CMOS) field effect transistors (FETs). Each CMOS FET is loaded with a capacitor. In some cases, the passive switching mixer is driven by a quadrature signal generator that is configured to operate at a reduced duty cycle.

While operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be employed. Moreover, the separation of various system components in the implementation descried above should not be understood as requiring such separation in all implementations, and it should be understood that the described program components and systems can generally be integrated together in a signal software product or packaged into multiple software products.

Also, techniques, systems, subsystems, and methods described and illustrated in the various implementations as discrete or separate may be combined or integrated with other systems, modules, techniques, or methods. Other items shown or discussed as coupled or directly coupled or communicating with each other may be indirectly coupled or communicating through some interface, device, or intermediate component, whether electrically, mechanically, or otherwise. Other examples of changes, substitutions, and alterations are ascertainable by one skilled in the art and could be made.

While the above-detailed description has shown, described, and pointed out the fundamental novel features of the disclosure as applied to various implementations, it will be understood that various omissions, substitutions, and changes in the form and details of the system illustrated may be made by those skilled in the art. In addition, the order of method steps are not implied by the order they appear in the claims.

What is claimed is:

1. A method, comprising:
   selecting, a particular frequency region among a first frequency region from 699 megahertz (MHz) to 960 MHz, a second frequency region from 1710 MHz to 2200 MHz, and a third frequency region from 2200 MHz to 2690 MHz, wherein each of the first, the second, and the third frequency regions comprises more than one frequency bands;
   configuring a harmonic filter of the particular frequency region, wherein the harmonic filter has a cutoff frequency, wherein the cutoff frequency is determined based on a second harmonic frequency of the lowest frequency band among the more than one frequency bands in the particular frequency region;
   receiving a signal in a frequency band;
   generating a filtered signal of the particular frequency region by filtering, using the harmonic filter, frequencies in the signal above the cutoff frequency; and
   amplifying the filtered signal of the particular frequency region by using a mixer-tuned low noise amplifier (LNA), wherein the mixer-tuned LNA includes a passive switching mixer and an LNA, the passive switching mixer presents a tunable impedance to the LNA, the LNA provides a voltage gain to the passive switching mixer, the voltage gain is proportional to the tunable impedance, the tunable impedance includes an in-band impendence for frequencies within the frequency band and an out-of-band impedance for frequencies outside of the frequency band, and the in-band impedance is greater than the out-of-band impedance.

2. The method of claim 1, wherein the passive switching mixer is configured to present tunable impedances for different frequency bands.

3. The method of claim 1, wherein the LNA comprises at least one of a cascode LNA or common base low noise amplifier.

4. The method of claim 1, wherein the passive switching mixer comprises a plurality of complementary metal oxide semiconductor (CMOS) field effect transistors (FETs), wherein each CMOS FET is loaded with a capacitor.

5. The method of claim 1, wherein the signal is formatted for a half-duplex operation.

6. The method of claim 1, wherein the passive switching mixer is driven by a quadrature signal generator that is configured to operate at a reduced duty cycle.

7. A user equipment (UE), comprising:
- an antenna configured to receive a signal in a frequency band, wherein the frequency band is one of a plurality of frequency bands, the plurality of frequency bands are grouped into three frequency regions, each of the three frequency regions comprises more than one frequency bands, and the three frequency regions includes a first frequency region from 699 megahertz (MHz) to 960 MHz, a second frequency region from 1710 MHz to 2200 MHz, and a third frequency region from 2200 MHz to 2690 MHz;
- a harmonic filter of a particular frequency region, wherein the harmonic filter is configured to generate a filtered signal of the particular frequency region among the three frequency regions by filtering frequencies in the signal above a cutoff frequency, wherein the cutoff frequency is determined based on a second harmonic frequency of the lowest frequency band among the more than one frequency bands in the particular frequency region; and
- a mixer-tuned low noise amplifier (LNA) configured to amplify the filtered signal of the particular frequency region, wherein the mixer-tuned LNA includes a passive switching mixer and an LNA, the passive switching mixer presents a tunable impedance to the LNA, the LNA provides a voltage gain to the passive switching mixer, the voltage gain is proportional to the tunable impedance, the tunable impedance includes an in-band impendence for frequencies within the frequency band and an out-of-band impedance for frequencies outside of the frequency band, and the in-band impedance is greater than the out-of-band impedance.

8. The UE of claim 7, wherein the passive switching mixer is configured to present tunable impedances for different frequency bands.

9. The UE of claim 7, wherein the LNA comprises at least one of a cascode LNA or common base low noise amplifier.

10. The UE of claim 7, wherein the passive switching mixer comprises a plurality of complementary metal oxide semiconductor (CMOS) field effect transistors (FETs), wherein each CMOS FET is loaded with a capacitor.

11. The UE of claim 7, wherein the signal is formatted for a half-duplex operation.

12. The UE of claim 7, wherein the passive switching mixer is driven by a quadrature signal generator that is configured to operate at a reduced duty cycle.

13. A user equipment (UE), comprising:
- an antenna configured to receive a signal in a frequency band, wherein the frequency band is one of a plurality of frequency bands, the plurality of frequency bands are grouped into three frequency regions, each of the three frequency regions comprises more than one frequency bands, and the three frequency regions includes a first frequency region from 699 megahertz (MHz) to 960 MHz, a second frequency region from 1710 MHz to 2200 MHz, and a third frequency region from 2200 MHz to 2690 MHz;
- a harmonic filter of a particular frequency region, wherein the harmonic filter is configured to generate a filtered signal of the particular frequency region among the three frequency regions by filtering frequencies in the signal above a cutoff frequency, wherein the cutoff frequency is determined based on a second harmonic frequency of the lowest frequency band among the more than one frequency bands in the particular frequency region; and
- a mixer-tuned low noise amplifier (LNA) configured to amplify the filtered signal of the particular frequency region, wherein the mixer-tuned LNA includes a passive switching mixer and an LNA, the passive switching mixer presents a tunable impedance to the LNA, the LNA provides a voltage gain to the passive switching mixer, the voltage gain is proportional to the tunable impedance, the tunable impedance includes an in-band impendence for frequencies within the frequency band and an out-of-band impedance for frequencies outside of the frequency band, and the in-band impedance is greater than the out-of-band impedance;
- a transmitter configured to transmit a different signal in the frequency band using the antenna and the harmonic filter; and
- a duplex switch configured to switch between receiving the signal and transmitting the different signal.

14. The UE of claim 13, wherein the passive switching mixer is configured to present tunable impedances for different frequency bands.

* * * * *